(12) United States Patent
Grois et al.

(10) Patent No.: US 6,505,976 B1
(45) Date of Patent: Jan. 14, 2003

(54) ALIGNMENT PIN ASSEMBLY FOR FIBER OPTIC CONNECTORS

(75) Inventors: Igor Grois, Northbrook, IL (US); Yuriy Belenkiy, Niles, IL (US); Barbara Grzegorewska, Chicago, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/975,584

(22) Filed: Oct. 11, 2001

(51) Int. Cl.[7] ................................................ G02B 6/36
(52) U.S. Cl. .............................. 385/78; 385/60; 385/71; 385/83
(58) Field of Search .............................. 385/78, 59, 60, 385/65, 83, 72, 71

(56) References Cited

U.S. PATENT DOCUMENTS 6,340,247 B1 * 1/2002 Sakurai et al. ................ 385/78

* cited by examiner

*Primary Examiner*—Phan T. H. Palmer
(74) *Attorney, Agent, or Firm*—A. A. Tirva

(57) ABSTRACT

A fiber optic connector assembly includes a body for mating with a complementary connecting device. An alignment pin subassembly is mounted in the body. The subassembly includes a pair of alignment pins having distal ends for projecting from the body into a pair of appropriate alignment holes in the complementary connecting device. A pin holding plate engages proximal ends of the alignment pins to hold the pins with the plate in the subassembly for mounting in the body.

26 Claims, 3 Drawing Sheets

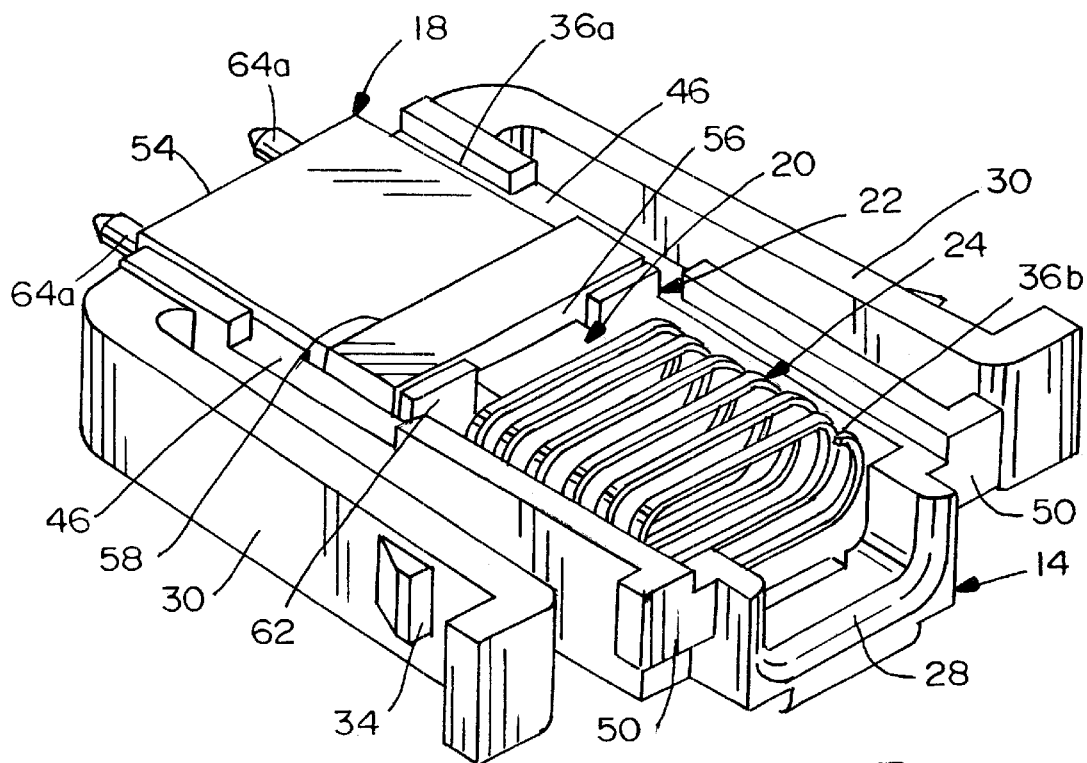
FIG.3
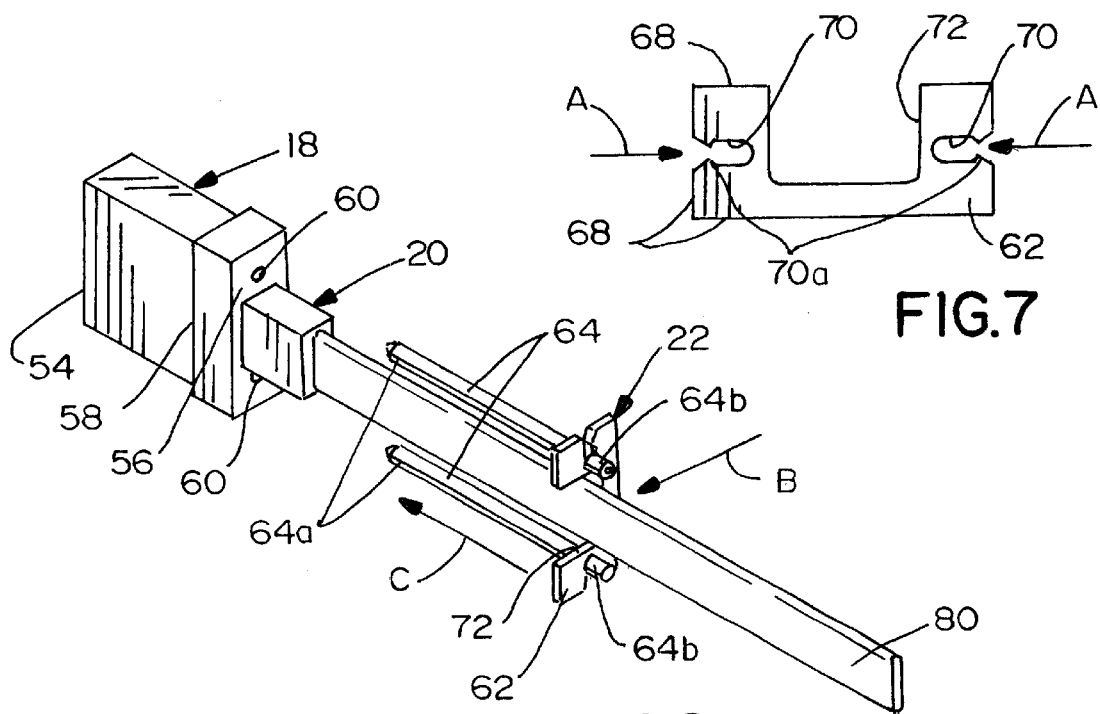
FIG.7
FIG.8

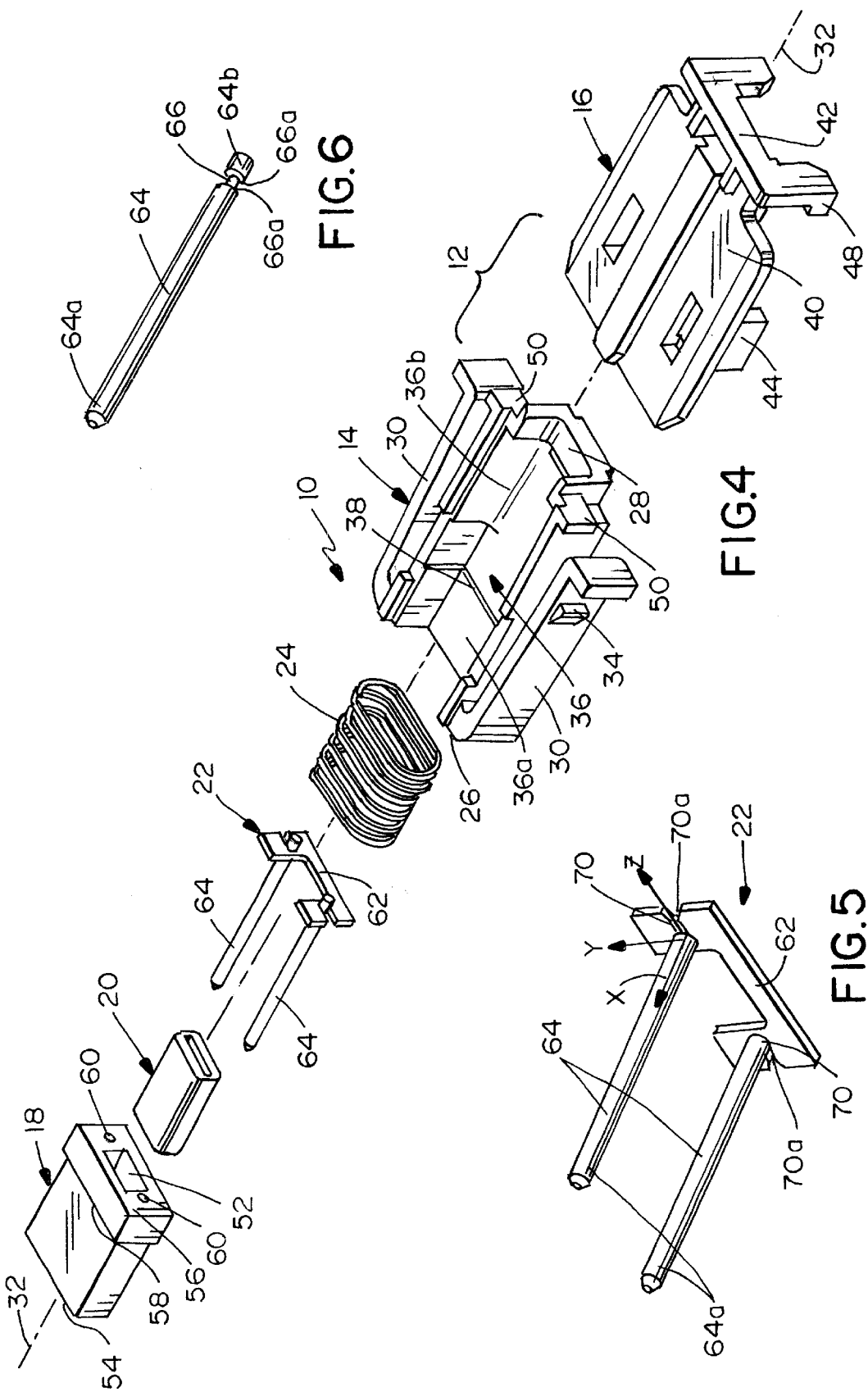

ALIGNMENT PIN ASSEMBLY FOR FIBER OPTIC CONNECTORS

FIELD OF THE INVENTION

This invention generally relates to the art of fiber optic connectors and, particularly, to an alignment/guide pin subassembly for use in a fiber optic connector which mates with a complementary connecting device.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

A pair of fiber optic connectors or a connector and another optical fiber transmission device often are mated in an adapter which centers the fibers to provide low insertion losses. The adapter couples the connectors together so that their encapsulated fibers connect end-to-end. The adapter couples the connectors together so that their encapsulated fibers connect end-to-end. The adapter may be an in-line component, or the adapter can be designed for mounting in an opening in a panel, backplane, circuit board or the like.

One of the problems with mating fiber optic connectors of the character described above involves aligning the ferrules of opposing or mating connectors so that the fibers connect end-to-end with minimal transmission losses. For instance, it is known to provide a ferrule of one connector with a pair of alignment pins which are inserted into a pair of alignment holes in an opposing ferrule of a mating connector. The pair of alignment pins/holes typically are disposed at opposite ends of an array of terminated optical fibers. This alignment pin system has proven effective when aligning a single pair of mating ferrules. However, such alignment pin systems continue to be plagued with problems during assembly of the fiber optic connectors. Specifically, the alignment pins are very small, thin components and are difficult to handle or manipulate during assembly of the connectors either by hand or machine. The present invention is directed to solving these problems by providing a novel pin holding mechanism which mounts the pins as a subassembly which is easy to manipulate and assemble in the overall connector and which allows for full floating movement of the alignment pins in the subassembly.

SUMMARY OF THE INVENTION

An object, therefore, of the invention is to provide a fiber optic connector assembly with and a new and improved alignment pin holding subassembly which facilitates mounting the pins within the connector.

In the exemplary embodiment of the invention, the connector includes a body for mating with a complementary connecting device. A ferrule is mounted on the body for terminating a plurality of optical fibers of a fiber optic cable. The ferrule has a forward mating face and a rear face. At least a pair of alignment pins extend through the ferrule and have distal ends projecting from the forward mating face of the ferrule for insertion into a pair of appropriate alignment holes in the complementary connecting device. A pin holding plate engages proximal ends of the alignment pins to hold the pins with the plate as a subassembly for mounting in the body behind the rear face of the ferrule. Preferably, the pin holding plate is fabricated of metal material and is generally planar in a direction generally perpendicular to the alignment pins.

According to one aspect of the invention, the pin holding plate has a pair of slots into which the alignment pins are retained to hold the pins assembled to the plate. The slots have restricted mouths past which the pins are snappingly retained in the slots. The slots are wider than the cross-dimensions of the alignment pins to provide for relative floating movement between the pins and the holding plate in a direction generally perpendicular to the pins. The alignment pins have reduced cross-sectional shank portions received in the slots. The lengths of the shank portions are greater than the thickness of the pin holding plate to provide for relative floating movement between the pins and the plate in a direction generally parallel to the pins.

According to another aspect of the invention, the pin holding plate has an outer periphery, with the slots being formed in the outer periphery of the plate. A recess is formed in the outer periphery of the plate for receiving the fiber optic cable so that the cable extends through the plate.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 3 is a view similar to that of FIG. 1, with the cover of the assembly removed;

FIG. 4 is an exploded perspective view showing the components of the connector assembly;

FIG. 5 is a perspective view of the alignment pin holding subassembly;

FIG. 6 is a perspective view of one of the alignment pins;

FIG. 7 is an elevational view of the pin holding plate; and

FIG. 8 is a perspective view showing the pin holding subassembly of FIG. 5 being assembled to the ferrule of the connector assembly with a fiber optic cable extending through the pin holding plate.

DETAILED DESCRIPTION OF THE PREFERRED EMBODIMENT

Figure 1:
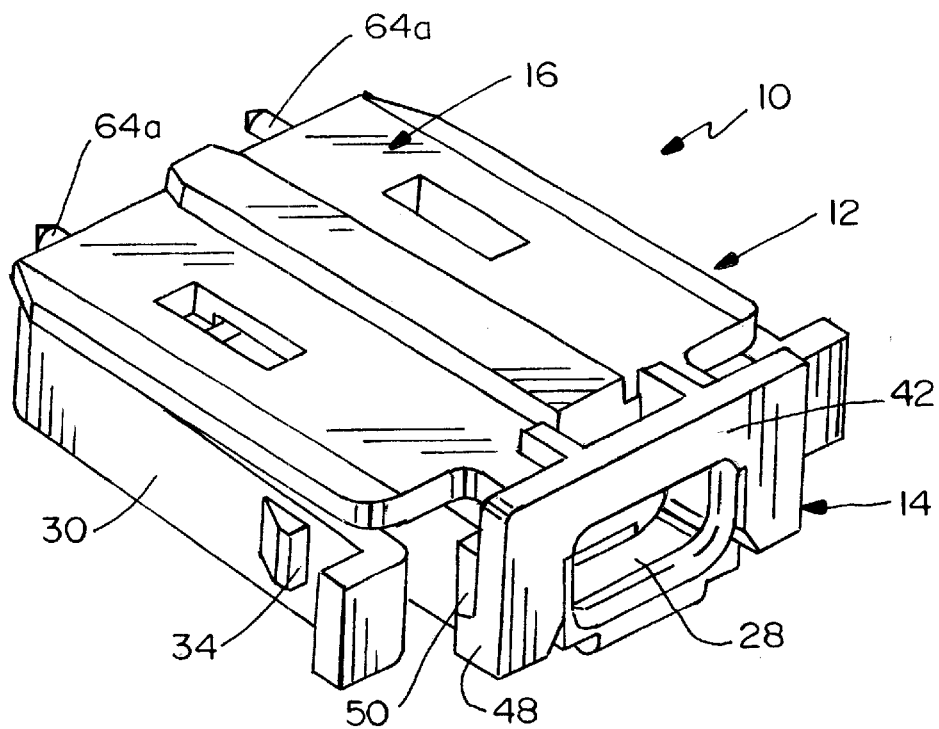
FIG. 1 is a top perspective view of a fiber optic connector assembly typical for incorporating the alignment pin holding subassembly of the invention.

Referring to the drawings in greater detail, and first to FIGS. 1–4, the invention is embodied in a fiber optic connector assembly, generally designated 10, which includes a two-part body, generally designated 12, designed for mating with a complementary connecting device (not shown). As seen best in FIG. 4, the two-part body 12 includes a housing, generally designated 14, and a cover, generally designated 16. The cover is mounted and latched on top of the housing as seen in FIG. 1, with the remaining components of the connector assembly mounted within the housing as seen in FIG. 3.

Referring to FIG. 4 in conjunction with FIG. 3, the remaining components of connector assembly 10 include a ferrule, generally designated 18; a ferrule boot, generally designated 20; an alignment pin holding subassembly, generally designated 22; and a coil spring, generally designated 24. All of these components are mounted within housing 14 as seen in FIG. 3 and as described in greater detail hereinafter. Cover 16 then is latched onto the top of housing 14 as seen in FIG. 1 to hold all of the components in assembly.

More particularly, housing 14 of two-part body 12 has a front mating face 26 and a rear face defined by a strain relief section 28. The housing may be a one-piece structure unitarily molded of plastic material or the like. A pair of latch arms 30 are integrally molded with the housing and extend in a cantilevered fashion rearwardly from front mating face 26 alongside the housing. The latch arms are flexible in a direction transversely of a longitudinal axis 32 of the connector assembly and include chamfered latch bosses 34 for interengagement with appropriate latch means on the complementary connecting device. Housing 14 further includes an open-ended interior cavity, generally designated 36, which includes a front cavity portion 36a and a rear cavity portion 36b separated by a rearwardly facing shoulder 38.

Cover 16 of two-part body 12 includes a cover plate 40 which, in essence, closes cavity 36 of housing 14. A rear strain relief section 42 combines with strain relief section 28 of the housing to provide a strain relief means for a fiber optic cable terminated to the connector assembly. Cover 16 is latched to housing 14 by a pair of primary latch arms 44 on the cover which snap into latching engagement with a pair of latch surfaces 46 on the housing. A pair of secondary latch arms 48 on strain relief section 42 of cover 16 also latchingly engage a pair of latch bosses 50 on the housing.

As seen best in FIG. 3, ferrule 18 is mounted within front cavity portion 36a of housing 14 and coil spring 24 is mounted within rear cavity portion 36b, with alignment pin holding subassembly 22 sandwiched therebetween. Ferrule 18 may be fabricated of such material as ceramic and includes a central through passage 52 through which the fiber optic cable extends surrounded by boot 20. The ferrule has a forward mating face 54 and a rear face 56, with a forwardly facing shoulder 58 therebetween. When the ferrule is mounted in housing 14, forwardly facing shoulder 58 engages forwardly facing shoulder 38 (FIG. 4) within cavity 36 of the housing. Finally, ferrule 18 includes a pair of alignment holes 60 extending entirely therethrough outside central through passage 52.

Figure 2:
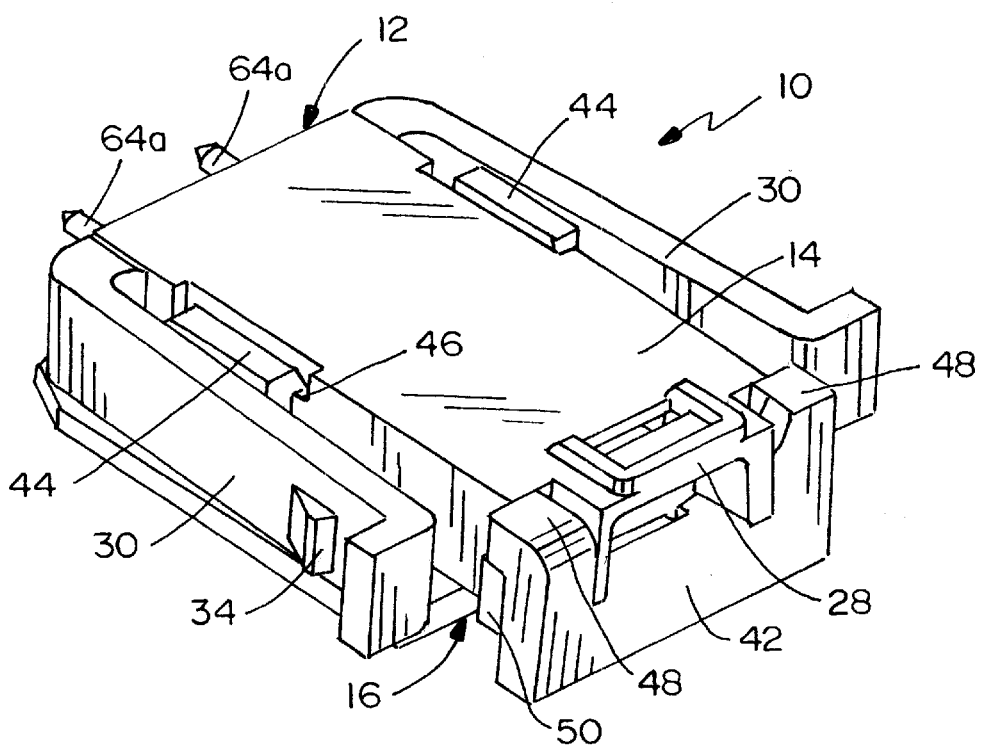
FIG. 2 is a bottom perspective view of the connector assembly.

Referring to FIG. 5 in conjunction with FIGS. 2 and 3, alignment pin holding subassembly 22 includes a pin holding plate 62 floatably mounting and retaining a pair of alignment pins 64. This subassembly 22 is mounted within housing 14 as seen in FIG. 3, with pin holding plate 62 abutting rear face 56 of ferrule 18 and held thereagainst by spring 24. Alignment pins 64 extend through alignment holes 60 (FIG. 4), with distal ends 64a of the alignment pins projecting forwardly of forward mating face 54 of the ferrule for insertion into a pair of appropriate alignment holes in the complementary connecting device.

Referring to FIG. 6, each alignment pin 64 generally is in the form of a thin cylindrical rod which may be fabricated of metal material, for instance. The alignment pin includes distal end 64a described above, along with a proximal end 64b which is mounted to and retained by pin holding plate 62. The diameter of the alignment pin near distal end 64b is reduced in cross-section to define a smaller diameter shank portion 66 between a pair of circumferential shoulders 66a.

Referring to FIG. 7, pin holding plate 62 is generally planar and may be fabricated of metal material. In assembly, the plane of the plate extends generally perpendicular to alignment pins 64 as seen in FIG. 5 and generally perpendicular to axis 32 of the connector assembly as seen in FIG. 4. The plate has an outer periphery defined by a peripheral edge 68. A pair of elongated slots 70 are formed in the peripheral outer edge at opposite sides of the plate for receiving and retaining alignment pins 64. A recessed area 72 forms a window in the outer peripheral edge of the plate, between slots 70, for receiving the fiber optic cable as seen hereinafter. Slots 70 have restricted mouths 70a past which alignment pins 64 are snappingly received and retained in the slots as described below.

Alignment pins 64 are assembled to pin holding plate 62 by moving reduced cross-sectional shank portions 66 of the pins into slots 70 past restricted mouths 70a in the direction of arrows "A" (FIG. 7). The diameters of shank portions 66 are greater than the widths of mouths 70a, so the shank portions are snappingly retained in the slots to not only mount alignment pins 64 to pin holding plate 62, but the alignment pins are retained or held to the plate as a subassembly. In other words, the alignment pins cannot fall out of the slots, and the entire subassembly of the pins and pin holding plate 62 can be manipulated for assembly as described below, without fear that the small alignment pins will become dislocated.

The invention contemplates that alignment pins 64 have substantially universal floating movement relative to pin holding plate 62. This best can be described in relation to FIG. 5 which shows "x", "y" and "z" directions. The "x" direction is generally longitudinally of the alignment pins, i.e., parallel to connector axis 32 (FIG. 4). The "y" direction is perpendicular to the pins in a generally up-and-down direction as viewed in the drawings. The "z" direction is perpendicular to both the "x" and "y" directions, i.e., in the opening direction of slots 70. The pins can float relative to the plate in the "x" direction because reduced cross-sectional shank portions 66 are made longer than the thickness of pin holding plate 62, while the main diameter of the alignment pins is greater than the widths of slots 70. In essence, reduced shank portion 66 of each pin forms shoulders 66a as seen in FIG. 6 for abutting opposite sides of the pin holding plate. The pins can float in the "y" direction, because shank portions 66 are made with smaller diameters than the vertical width of slots 70. The pins can float in the "z" direction because shank portions 66 have smaller diameters than the elongated horizontal dimension of slots 70.

FIG. 8 shows how simple the alignment pin holding subassembly 22 (FIG. 5) can be assembled to ferrule 18, with a fiber optic cable 80 already terminated to the ferrule. Subassembly 22 simply is moved transversely of the cable in the direction of arrow "B" so that the cable enters recessed area 72 of the plate. The subassembly then is moved forwardly in the direction of arrow "C" until distal ends 64a of alignment pins 64 enter alignment holes 60 in rear face 56 of the ferrule. Insertion of the pins into the holes is facilitated by the pointed configuration of the distal ends as seen best in FIGS. 5 and 6, as well as the universal relative floating movement between the alignment pins and pin holding plate 62 as described above.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A fiber optic connector assembly, comprising:
   a body for mating with a complementary connecting device;
   a ferrule mounted on the body for terminating a plurality of optical fibers of a fiber optic cable, the ferrule having a forward mating face and a rear face;
   at least a pair of alignment pins extending through the ferrule and having distal ends projecting from the forward mating face of the ferrule for insertion into a pair of appropriate alignment holes in the complementary connecting device; and
   a pin holding plate engaging proximal ends of the alignment pins to hold the pins with the plate as a subassembly for mounting in the body behind the ferrule.

2. The fiber optic connector assembly of claim 1 wherein said pin holding plate has a pair of slots into which the alignment pins are retained to hold the pins assembled to the plate.

3. The fiber optic connector assembly of claim 2 wherein said alignment pins have reduced cross-sectional shank portions received in said slots, the lengths of the shank portions being greater than the thickness of the pin holding plate to provide for relative floating movement between the pins and the plate in a direction generally parallel to the pins.

4. The fiber optic connector assembly of claim 3 wherein said slots are wider than the cross-sectional dimensions of the shank portions to provide for relative floating movement between the pins and the plate in a direction generally perpendicular to the pins.

5. The fiber optic connector assembly of claim 2 wherein said slots are wider than the cross-dimensions of the alignment pins at the slots to provide for relative floating movement between the pins and the plate in a direction generally perpendicular to the pins.

6. The fiber optic connector assembly of claim 2 wherein said slots have restricted mouths past which the pins are snappingly retained in the slots.

7. The fiber optic connector assembly of claim 2 wherein said pin holding plate has an outer periphery with said slots being formed in the outer periphery of the plate.

8. The fiber optic connector assembly of claim 1 wherein said pin holding plate is generally planar in a direction generally perpendicular to the alignment pins.

9. The fiber optic connector assembly of claim 1 wherein said pin holding plate has an outer periphery which includes a recess for receiving the fiber optic cable so that the cable extends through the plate.

10. The fiber optic connector assembly of claim 1 wherein said pin holding plate is fabricated of metal material.

11. A fiber optic connector assembly, comprising:
    a body for mating with a complementary connecting device;
    a ferrule mounted on the body for terminating a plurality of optical fibers of a fiber optic cable, the ferrule having a forward mating face and a rear face;
    at least a pair of alignment pins extending through the ferrule and having distal ends projecting from the forward mating face of the ferrule for insertion into a pair of appropriate alignment holes in the complementary connecting device; and
    a pin holding plate which is generally planar in a direction generally perpendicular to the alignment pins and which defines an outer peripheral edge, a recess in said edge for receiving the fiber optic cable so that the cable extends through the plate, and a pair of slots in said edge into which the alignment pins are retained to hold the pins with the plate as a subassembly for mounting in the body behind the rear face of the ferrule.

12. The fiber optic connector assembly of claim 11 wherein said alignment pins have reduced cross-sectional shank portions received in said slots, the lengths of the shank portions being greater than the thickness of the pin holding plate to provide for relative floating movement between the pins and the plate in a direction generally parallel to the pins.

13. The fiber optic connector assembly of claim 12 wherein said slots are wider than the cross-sectional dimensions of the shank portions to provide for relative floating movement between the pins and the plate in a direction generally perpendicular to the pins.

14. The fiber optic connector assembly of claim 11 wherein said slots have restricted mouths past which the pins are snappingly retained in the slots.

15. The fiber optic connector assembly of claim 11 wherein said slots are wider than the cross-dimensions of the alignment pins at the slots to provide for relative floating movement between the pins and the plate in a direction generally perpendicular to the pins.

16. The fiber optic connector assembly of claim 11 wherein said pin holding plate is fabricated of metal material.

17. A fiber optic connector assembly, comprising:
    a body for mating with a complementary connecting device; and
    an alignment pin subassembly for mounting in the body, the subassembly including
       a pair of alignment pins having distal ends for projecting from the body into a pair of appropriate alignment holes in the complementary connecting device, and
       a pin holding plate engaging proximal ends of the alignment pins to hold the pins with the plate in the subassembly for mounting in the body.

18. The fiber optic connector assembly of claim 17 wherein said pin holding plate has a pair of slots into which the alignment pins are retained to hold the pins assembled to the plate.

19. The fiber optic connector assembly of claim 18 wherein said alignment pins have reduced cross-sectional shank portions received in said slots, the lengths of the shank portions being greater than the thickness of the pin holding plate to provide for relative floating movement between the pins and the plate in a direction generally parallel to the pins.

20. The fiber optic connector assembly of claim 19 wherein said slots are wider than the cross-sectional dimensions of the shank portions to provide for relative floating movement between the pins and the plate in a direction generally perpendicular to the pins.

21. The fiber optic connector assembly of claim 18 wherein said slots are wider than the cross-dimensions of the alignment pins at the slots to provide for relative floating movement between the pins and the plate in a direction generally perpendicular to the pins.

22. The fiber optic connector assembly of claim 18 wherein said slots have restricted mouths past which the pins are snappingly retained in the slots.

23. The fiber optic connector assembly of claim 18 wherein said pin holding plate has an outer periphery with said slots being formed in the outer periphery of the plate.

24. The fiber optic connector assembly of claim 17 wherein said pin holding plate is generally planar in a direction generally perpendicular to the alignment pins.

25. The fiber optic connector assembly of claim 17 wherein said pin holding plate includes a recess for receiving the fiber optic cable so that the cable extends through the plate.

26. The fiber optic connector assembly of claim 17 wherein said pin holding plate is fabricated of metal material.

* * * * *